United States Patent

Pendleton

[11] 4,013,321
[45] Mar. 22, 1977

[54] PNEUMATICALLY ACTUATED HOPPER-FEEDER APPARATUS

[75] Inventor: Frank P. Pendleton, Montclair, N.J.

[73] Assignee: VAC-U-MAX, Belleville, N.J.

[22] Filed: Nov. 21, 1974

[21] Appl. No.: 525,768

[52] U.S. Cl. ............................................. 302/59
[51] Int. Cl.² ...................................... B65G 53/60
[58] Field of Search ............ 302/3, 59, 21, 22, 23, 302/62, 42; 55/319, 320, 432; 222/450, 504, 193, 58; 198/39, 504, 505

[56] References Cited

UNITED STATES PATENTS

| | | | |
|---|---|---|---|
| 2,556,058 | 6/1951 | Boon | 302/17 |
| 2,708,142 | 5/1955 | Donovan | 302/59 |
| 2,730,407 | 1/1956 | Berg | 302/17 |
| 3,169,038 | 2/1965 | Pendleton | 302/59 |
| 3,273,943 | 9/1966 | Russell | 302/59 |
| 3,297,370 | 1/1967 | Moriarity | 302/59 |
| 3,423,130 | 1/1969 | Milner | 302/59 X |
| 3,476,439 | 11/1969 | Homan | 302/59 X |
| 3,489,464 | 1/1970 | Delfs | 302/42 X |
| 3,561,824 | 2/1971 | Homan | 302/59 |
| 3,737,074 | 6/1973 | Davies | 302/59 X |

FOREIGN PATENTS OR APPLICATIONS 924,328    4/1963   United Kingdom ................ 302/59

*Primary Examiner*—Evon C. Blunk
*Assistant Examiner*—James L. Rowland

[57] ABSTRACT

A pneumatically actuated hopper is provided comprising a substantially straight-walled, vertical, cylindrical main tubular body portion provided with an outwardly flared upper portion having an inverted frusto-conical configuration, a top cover having an inlet connectable with a source of vacuum, a filter screen beneath said inlet and separated therefrom by supporting means, a materials inlet beneath said filter screen leading into said hopper near the junction of said tubular body and said flared top portion, a baffle extending from said inlet within said hopper to direct materials downwardly into said tubular body, and a closure valve extending across the entire diameter of the lower discharge end of said tubular body and operable upon demand to open and expose the said entire discharge end to discharge of the material contained in said hopper.

5 Claims, 3 Drawing Figures

PNEUMATICALLY ACTUATED HOPPER-FEEDER APPARATUS

BACKGROUND OF THE INVENTION

The pneumatic conveying of various materials has begun to achieve wide acceptance in the art of materials handling, particularly since it is possible to efficiently convey a wide variety of materials in substantially completely closed systems in an economic manner, and where significant, with minimum risk of explosion or fire otherwise due to mechanically induced electrostatic charges or electrical discharges which occasionally result when electrical control systems are utilized.

The essential component in such pneumatically operated systems generally consists of a hopper and/or feeder which delivers material from a remote source through the hopper and/or feeder to a point of consumption of the material being conveyed by means of a partial vacuum generated by pneumatically operated vacuum producing devices actuated by high pressure air from a central source or individual air compressors, a particularly useful device being a venturi power unit which produces a substantial vacuum upon passage of high pressure air through the venturi tube.

Conventional hoppers, which are utilized for the conveyance of a wide variety of materials, generally consist of an upright cylindrical body having an inverted conical lower portion depending therefrom and terminating in a much smaller discharge port which may be actuated by a variety of discharge valve mechanisms. Such hoppers are utilized in all types of systems, including pneumatically actuated systems.

While the conventional form of hopper is quite satisfactory for the conveyance of many materials, serious difficulties are frequently encountered with certain materials which tend to bridge in the conical portion of the hopper leading to the discharge valve. For example, very bulky materials, such as bottle caps, corks, balls of nylon waste and moist or hygroscopic materials, and the like, will almost invariably cause bridging problems in conventional conical hoppers, resulting in significant shut-down time and possible loss of at least some of the material being conveyed.

While the use of external vibratory mechanisms tends to alleviate this problem to some degree, such devices have not proved to be a complete solution to the problem caused by the restrictive conical hopper configuration in relation to the type of material being conveyed. Mechanical agitation of the hopper contents is also utilized, but this results in mechanically complicated and expensive equipment.

Similar bridging problems are encountered with dry, dusty materials, especially those which are finely divided and highly dense, or bulky and yet very dusty. Such materials add a further complication if they are to be pneumatically conveyed, since the conventional wide-mouthed conical hopper suffers from the limitations inherent in the conical discharge portion; yet a straight-walled tubular hopper may not provide a sufficiently large enough area to introduce adequate capacity for efficient screening of the dust from the vacuum system as required.

SUMMARY OF THE INVENTION

The foregoing disadvantages of the prior art are overcome by providing a pneumatically actuated hopper and/or feeder apparatus having a substantially straight-walled, tubular body portion extending essentially from the inlet port to the discharge valve, the discharge valve in turn extending across substantially the complete diameter of the lower end of the tubular body. The hopper of this invention thus offers little or no resistance to materials flowing therethrough, that otherwise would tend to bridge in conventional hoppers. Thus, bulky materials and others which are capable of being conveyed by pneumatic means may be introduced into the hopper, retained thereby and delivered to a point of consumption without risk of bridging within the hopper.

The relative dimensions of the hopper, i.e. in particular, the diameter of the main cylindrical body in relation to its depth, are determined by a number of factors, including the capacity of the vacuum generating equipment to be associated therewith, the rate of feed required by the hopper and the amount of material to be periodically metered out of the hopper per unit of time. These factors will affect the relative diameter of the cylindrical body as well as its depth and the diameter of the inlet port for the material to be fed thereto. The discharge port is at least substantially the full inside diameter of the tubular body portion and may effectively be greater by terminating the tubular body on the bias, thereby giving the discharge port an oval configuration.

Where the practicalities of a given industrial application may limit the size of the cylindrical hopper body, difficulties may still be encountered where dry, dusty materials are to be conveyed by the apparatus. For example, vacuum or pneumatically operated hoppers are generally provided with some form of filter between the source of vacuum and the inlet of the material being conveyed into the hopper to prevent dust from being introduced into the vacuum and/or pneumatic system. Thus, where highly dusty materials are involved, the screening capacity of a relatively small tubular hopper may not be completely effective.

Accordingly, the top of the hopper in such instances is, according to this invention, provided with a flared upper portion (substantially of an inverted frusto-conical configuration) which makes available to the interior of the upper portion of the hopper a much larger filter area for removing dust. In this manner, the invention combines the relative advantages of a relatively small straight-walled tubular hopper (which avoids bridging) with the higher filtration capacity of larger wide mouthed conventional hoppers but without the disadvantages of such conventional hoppers.

DESCRIPTION OF THE PREFERRED EMBODIMENT

Further objects and advantages of the invention will become more fully apparent from the following more detailed description, in relation to the drawings, wherein.

Figure 1:
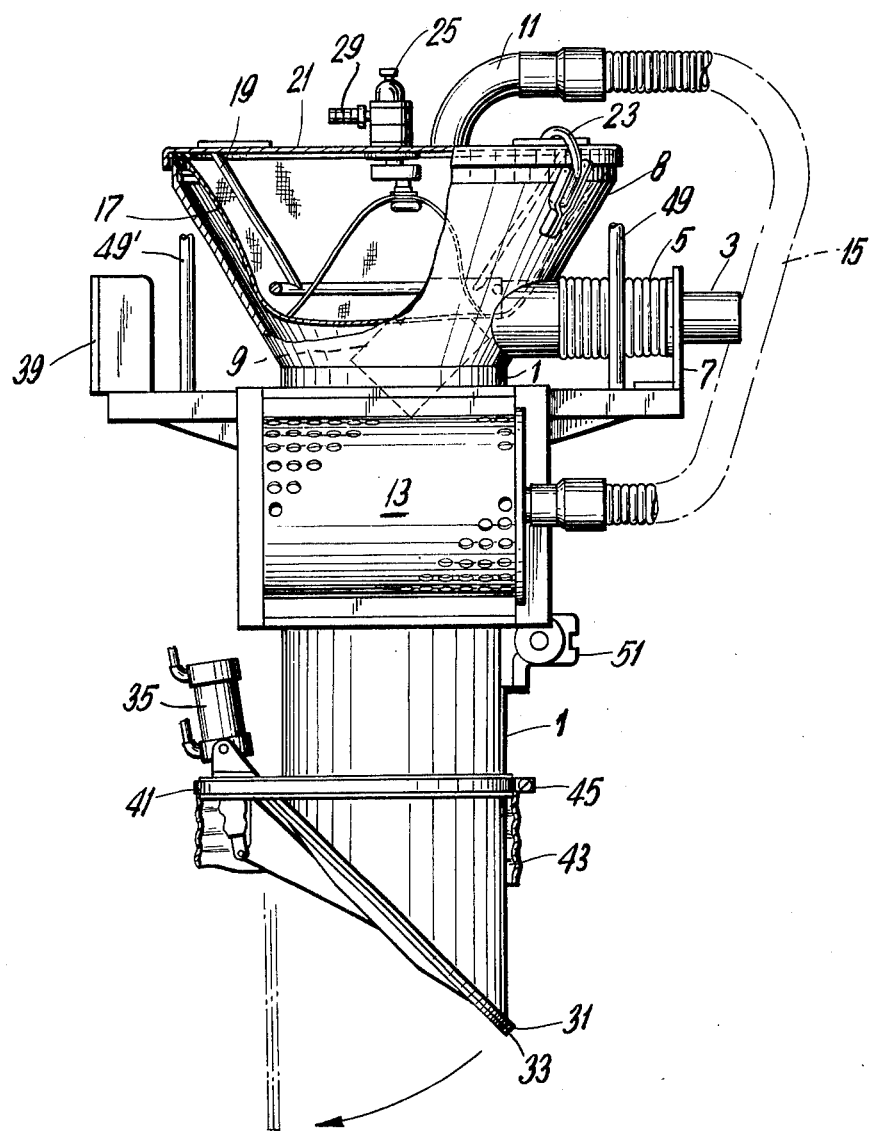
FIG. 1 is a side elevational view, partly in section, of a hopper and apparatus associated therewith, in accordance with this invention.

Referring now to FIG. 1, element 1 is a generally cylindrical straight-walled tubular body portion extending from the upper region to the bottom portion of the hopper. The main tubular body portion is advantageously about 12 inches in diameter and its depth may be as much as 5 feet or more, depending upon the amount of material to be retained thereby.

The top of main tubular body portion 1 is provided with an upper outwardly flared portion 8 having an inverted frusto-conical configuration, to provide additional capacity for filtration of dusty materials from the materials introduced through an inlet tube 3, preferably of about 4 inches in diameter, and leading into the upper region of the hopper.

The relative diameters of the main body portion 1 and the top of the flared portion 8 may vary with the capacity of the filtration desired, but advantageously the top of flared portion 8 is about twice the diameter of main body portion 1. Particularly advantageous results are obtained with a main body of about 12 inches when the top of the flared portion is about 24 inches. The depth of the flared portion 8 should be such that this portion can accommodate dust filtration means as hereinafter described. Moreover, the degree of the flared portion may vary from about 45° to 60° from a horizontal for most advantageous results.

Inlet 3 may be directly affixed to the body portion 1 or, as shown in FIG. 1, rigidly supported by a frame 7 and separated from hopper 1 by a resilient tube 5, preferably constructed of reinforced vinyl plastic material, to permit the hopper to "float", when the hopper is provided with an automatic demand controller to discharge material in response to the weight of material contained in the hopper.

When flexible tube 5 is used, a further short inlet tube (not shown) is affixed to the hopper and tube 5, and extends within the hopper wherein it is connected to a baffle 9 which may also conveniently be in the form of a tube having the bottom portion cut away to deflect the incoming material from the top to the bottom of the hopper. This may also be an extension of the inlet tube 3, the interior portion of which is cut away as indicated.

Figure 2:
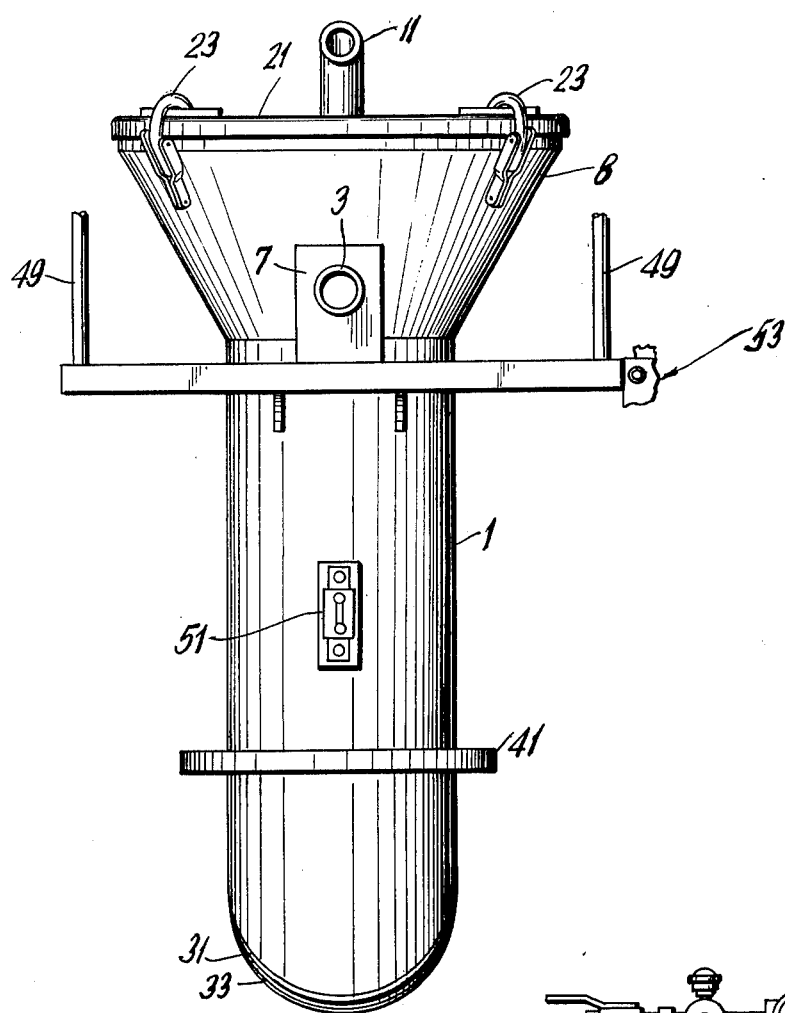
FIG. 2 is a front elevational view of the hopper of FIG. 1.

Baffle 9 may also take the form of an elbow or partial elbow downwardly inclined as indicated in FIG. 1, such as an open bottomed U-shaped baffle affixed to inlet 3 or an extension thereof by means of suitable clamping devices, not shown. Inlet 3 and baffle 9 may be located in the flared portion 8 of the hopper (as shown in FIGS. 1 and 2) or it may be situated slightly therebelow in main body portion 1.

The material to be conveyed into the hopper is sucked into the top portion by means of vacuum introduced to the top of the hopper through vacuum inlet 11, which is advantageously connected to a venturi vacuum generating power unit 13 actuated by high pressure air and connected to vacuum inlet 11 through tube 15. Of course, any central source of vacuum generated power may be employed.

Above baffle 9 and separating the same from vacuum inlet 11, there is provided a dust filter bag 17 to prevent any dust and/or other material being conveyed into the hopper from passing into the vacuum system. Filter bag 17 is supported by a frame 19 suspended from the top of main body 1 by means of a cover 21 affixed thereto by clamps 23 and 23' as shown in FIGS. 2 and 3, which effectively seal the hopper during operation.

For removing the dust from bag 17 on a periodic basis there is provided a pneumatically operated shaker motor 25 which is connected though an eccentric 27 to tabs 29 affixed to dust bag 17, which result in the shaking of bag 17 when motor 25 is periodically operated.

The bottom of main body 1 of the hopper is cut on the bias at 31, preferably about 45°, to cooperate with a flap type dump valve 33 which is operated by an automatic pneumatic dump valve cylinder 25 through a mechanical linkage 37 to discharge material from the hopper. The air operated dump valve cylinder 35 may if desired be operationally connected to a demand controller 39 which is responsive to the weight of the material contained within the hopper and thereby to open and discharge the contents of the hopper upon its receipt of a predetermined weight of material. Dump valve cylinder 35 is advantageously supported on a flange 41 eccentrically mounted on main tubular body 1 to provide an area for mounting of dump valve cylinder 35. Flange 41 also may carry a dust sleeve 43 which is clamped to flange 41 by means of a dust sleeve hose clamp 45, the dust sleeve 43 surrounding the discharge valve 33 and at least the top of the point of discharge of the hopper to prevent dust from entering the surrounding atmosphere.

Figure 3:
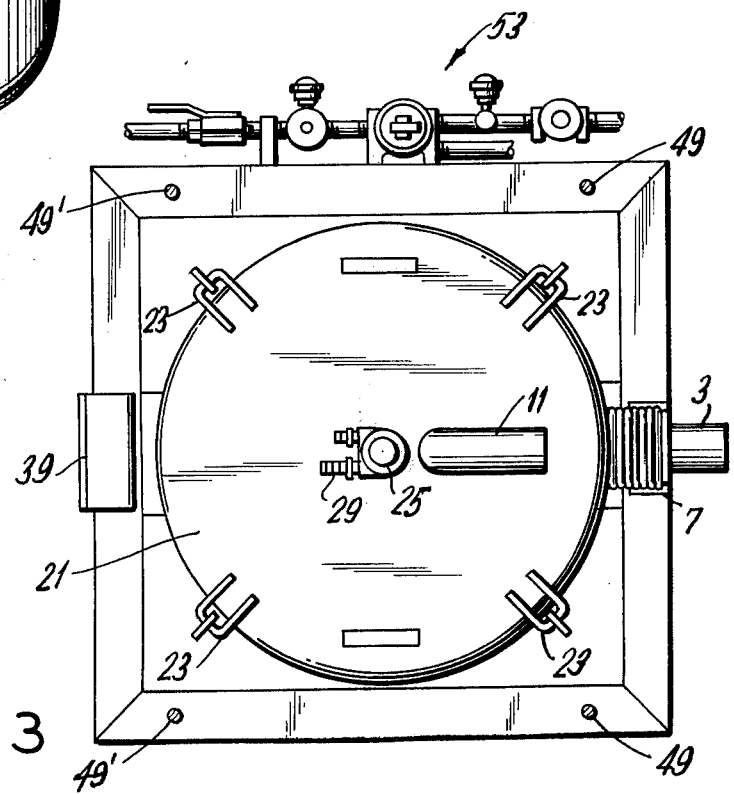
FIG. 3 is a top plan view of the hopper shown in FIG. 1.

The hopper may be suspended by various means, such as mounting bracket 47 and suspension rods 49 and 49' (shown in FIGS. 2 and 3). Although not necessary for most purposes in view of the unique construction of the hopper of this invention, a vibrator 51 may also be provided to assist in the flow of material through the hopper 1, in the case of exceptionally troublesome materials.

The vacuum system is advantageously controlled by a control manifold generally indicated at 53, which delivers to the system air at at least 60 pounds per square inch, for actuation of controls and vacuum generation equipment.

Resort may be had to such modifications and equivalents as fall within the spirit of the invention and the scope of the appended claims.

I claim:

1. A pneumatically actuated hopper comprising a substantially straight-walled, vertical, cylindrical main body portion provided with an outwardly flared upper portion having an inverted frusto-conical configuration, a top cover having an inlet connectable with a source of vacuum, a filter beneath said inlet generally conforming to the interior configuration of said upper portion, located within said frustoconical portion, and separated therefrom by supporting means, a materials inlet beneath said filter screen leading into said hopper near the junction of said tubular body and said flared top portion, a baffle extending from said inlet within said hopper to direct materials downwardly into said tubular body, and a closure valve extending across the entire diameter of the lower discharge end of said tubular body and operable upon demand to open and expose the said entire discharge of end to discharge of the material contained in said hopper.

2. A hopper according to claim 1, wherein said materials inlet is located at the base of said inverted frusto-conical flared upper portion of said hopper.

3. A pneumatically actuated hopper comprising a substantially straight-walled, vertical, cylindrical main tubular body portion provided with an outwardly flared upper portion having an inverted frusto-conical configuration, a top cover having an opening connectable with a source of vacuum, a filter screen beneath said opening and separated therefrom by supporting means, a materials inlet beneath said filter screen leading into said hopper at the top of said tubular body portion and immediately below the base of said inverted frusto-conical flared upper portion of said hopper, a baffle extending from said inlet within said hopper to direct materials downwardly into said tubular body, and a pneumatically actuated flap type dump valve extending across the entire diameter of the lower discharge end of said tubular body and operable upon demand to open and expose the said entire discharge end to discharge the material contained in said hopper.

4. A hopper according to claim 1, wherein a flange is provided near and about the base of said hopper supporting an air-actuated discharge dump valve cylinder operably connected to said closure valve.

5. A hopper according to claim 1, wherein the discharge end of said tubular body and said closure valve are disposed at an angle of about 45° from the verticle.

* * * * *